United States Patent [19]
Kawamoto et al.

[11] Patent Number: 5,613,740
[45] Date of Patent: Mar. 25, 1997

[54] BRAKE SYSTEM FOR VEHICLE

[75] Inventors: Yoshimichi Kawamoto; Hiromi Inagaki; Kazuya Sakurai; Shinji Suto, all of Wako, Japan

[73] Assignee: Honda Giken Kogyo Kabushiki Kaisha, Tokyo, Japan

[21] Appl. No.: 307,228

[22] Filed: Sep. 16, 1994

[30]    Foreign Application Priority Data

Sep. 16, 1993   [JP]   Japan .................................... 5-229938

[51] Int. Cl.⁶ .................................................... B60T 13/16
[52] U.S. Cl. ......................... 303/11; 303/155; 303/113.4
[58] Field of Search .................................. 303/10, 11, 20, 303/113.4, 115.1, 115.4, 116.2, 117.1, DIG. 2–DIG. 4, 155, 120.09, 122.1, 122.11

[56]              References Cited

U.S. PATENT DOCUMENTS

| | | | |
|---|---|---|---|
| 4,435,021 | 3/1984 | Hoenick | 303/155 X |
| 4,462,642 | 7/1984 | Leiber | 303/DIG. 4 |
| 4,919,493 | 4/1990 | Leiber | 303/DIG. 3 |
| 5,106,167 | 4/1992 | Matsuda | 303/155 X |
| 5,150,951 | 9/1992 | Leiber et al. | 303/DIG. 4 |
| 5,152,585 | 10/1992 | Patient et al. | 303/155 X |
| 5,169,215 | 12/1992 | Takata | 303/DIG. 4 |
| 5,222,787 | 6/1993 | Eddy et al. | 303/10 |
| 5,302,008 | 4/1994 | Miyake et al. | 303/20 X |

*Primary Examiner*—Lee W. Young
*Attorney, Agent, or Firm*—Armstrong, Westerman, Hattori, McLeland & Naughton

[57]              ABSTRACT

A brake system for a vehicle includes a master cylinder for outputting a liquid pressure corresponding to a braking operation quantity, an electric actuator capable of outputting the liquid pressure corresponding to the braking operation quantity, and a switch-over valve capable of switching the connection and disconnection between the master cylinder and wheel brake. The electric actuator is connected to the wheel brake to block the back flow of a working liquid from the wheel brake. Braking pressure applied to the wheel brake is detected by pressure detector. When a difference between the detected braking pressure and a target braking pressure corresponding to the braking operation quantity exceeds a predetermined range, an output liquid pressure from the master cylinder is applied to the wheel brake. Thus, even if a trouble is produced in the electric actuator, itself, or a drive circuit for driving the electric actuators, the braking pressure for the wheel brake is prevented from being reduced undesirably.

6 Claims, 6 Drawing Sheets

BRAKE SYSTEM FOR VEHICLE

BACKGROUND OF THE INVENTION

1. Field of the Invention

The present invention relates to a brake system for a vehicle, including at least one wheel brake and a master cylinder for outputting a liquid pressure corresponding to a braking operation quantity, an operation quantity detector for detecting a braking operation quantity, a braking pressure control means for outputting an electric signal corresponding to a target braking pressure determined on the basis of a detection value detected by the operation quantity detector, an electric actuator capable of outputting a liquid pressure corresponding to an output electric signal from the braking pressure control means, and a switch-over valve capable of switching the connection and disconnection between the master cylinder and the wheel brake, the electric actuator being connected to the wheel brake for blocking the flow of working liquid from the wheel brake into the electric actuator when the switch-over valve permits the master cylinder and the wheel brake to be put into communication with each other.

2. Description of the Prior Art

Such a system has been conventionally known, for example, from Japanese Patent Application Laid-open No. 95556/92.

In such prior art brake system, the output liquid pressure from a liquid pressure source, for outputting a given liquid pressure, is adjusted in accordance with a braking operation quantity and is outputted from the electric actuator. During a normal braking operation, an output liquid pressure from the electric actuator is applied to the wheel brake. But when the output liquid pressure from the liquid pressure source is abnormally reduced due to a defect in liquid pressure, or the like, the switch-over valve permits the output liquid pressure from the master cylinder to be applied to the wheel brake. However, even if the output liquid pressure from the liquid pressure source is normal, if there is a trouble in the electric actuators, themselves, or an electric circuit for driving the electric actuators, or a trouble in the operation quantity detector for detecting braking operation quantity, a braking pressure, intended by a vehicle's driver, may not be provided in some cases.

SUMMARY OF THE INVENTION

Accordingly, it is an object of the present invention to provide a brake system for a vehicle, wherein, even if a trouble is produced in the electric circuit for driving the electric actuators, or in the operation quantity detector, the braking pressure for the wheel brake is prevented from being reduced undesirably.

To achieve the above object, according to a first aspect and feature of the present invention, there is provided a brake system for a vehicle, comprising:

pressure detectors for detecting braking pressures applied to the wheel brakes;

a switch-over valve for placing the master cylinder and each wheel brake to be put into or out of communication with each other; and a switch-over valve control means for controlling the operation of the switch-over valve to a state in which the master cylinder and the wheel brake are put into communication with each other, when a difference between the target braking pressure and a detection value detected by the pressure detector exceeds a predetermined range.

With the first feature, it is possible to judge a problem in the electric actuators, themselves, or in a drive circuit for driving the electric actuators, thereby applying a liquid pressure from the master cylinder to the wheel brakes. Thus, even if such trouble is produced, the braking liquid pressure can be prevented from being reduced undesirably.

In addition, according to a second aspect and feature of the present invention, there is provided a brake system for a vehicle system for a vehicle, which comprises:

a pressure detector for detecting an output liquid pressure from the master cylinder;

a switch-over valve controlling the placing for controlling the the master cylinder and the wheel brake to be put into or out of communication with each other, and a switch-over valve control means for controlling the operation of the switch-over valve to a state in which the master cylinder and the wheel brake are put into communication with each other, when a difference between a reference master cylinder pressure determined on the basis of the braking operation quantity and a detection value detected by the pressure detector exceeds a predetermined range.

With the second feature, it is possible to judge a trouble in the operation quantity detector, thereby applying a liquid pressure from the master cylinder to the wheel brakes. Thus, even if such a trouble is produced, the braking liquid pressure can be prevented from being reduced undesirably.

The above and other objects, features and advantages of the invention will become apparent from the following description of preferred embodiments taken in conjunction with the accompanying drawings.

BRIEF DESCRIPTION OF THE DRAWINGS

FIGS. 1 to 5 illustrate a first embodiment, wherein:

FIG. 1 is a diagram of a brake hydraulic pressure system;

FIG. 2 is a sectional view illustrating an arrangement of an electric actuator;

FIG. 3 is a diagram illustrating a control system for the electric actuators and switch-over valves;

FIG. 4 is a flow chart illustrating a portion of a switch-over valve control procedure;

FIG. 5 is a flow chart illustrating the rest portion of the switch-over valve control procedure.

DESCRIPTION OF THE PREFERRED EMBODIMENTS

The present invention will now be described by way of embodiments in connection with the accompanying drawings.

Figure 1:
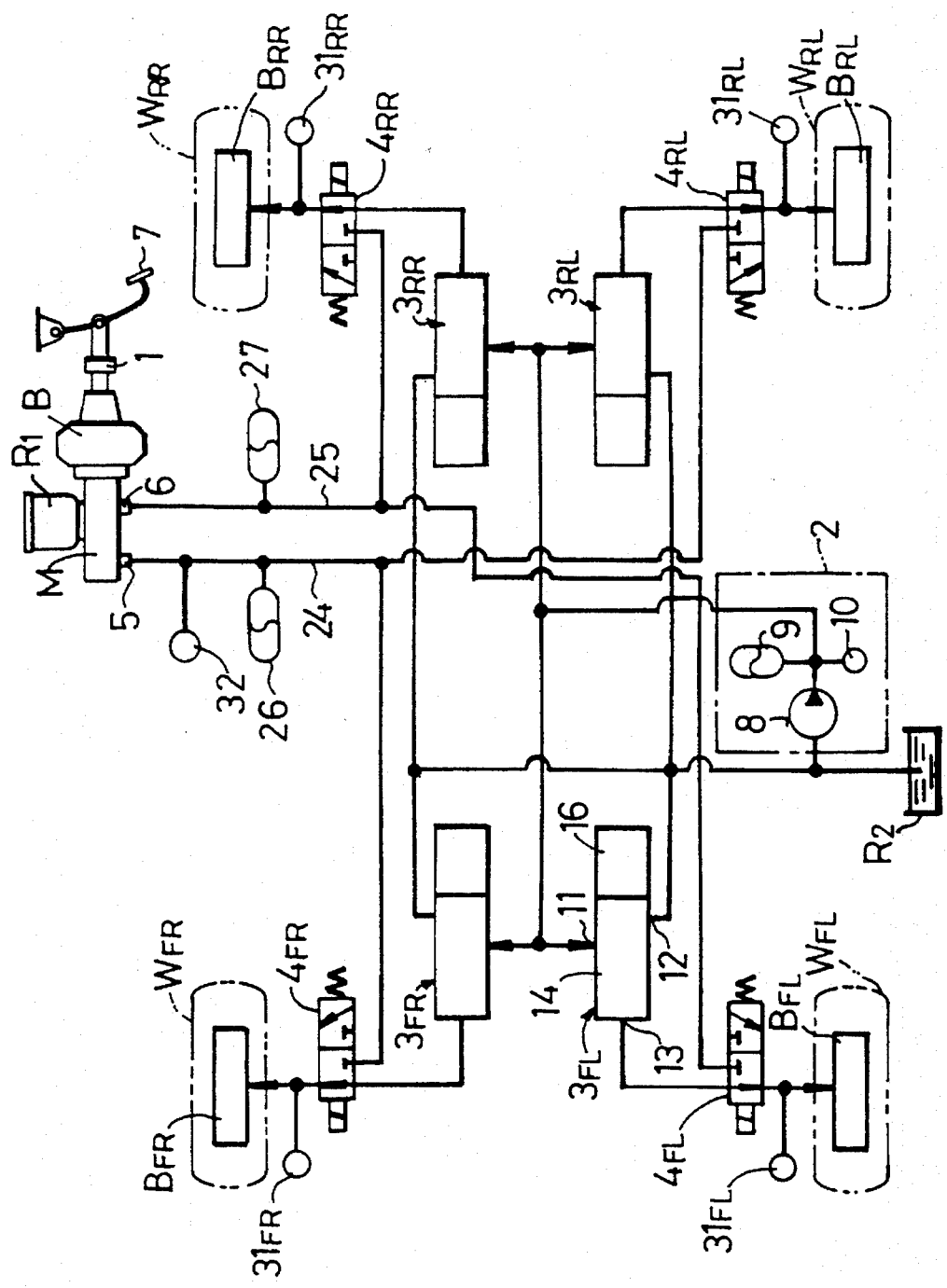

Referring first to FIG. 1, a brake device of the first embodiment includes wheel brakes $B_{FL}$, $B_{FR}$, $B_{RL}$ and $B_{RR}$ independently mounted on left and right front wheels $W_{FL}$ and $W_{FR}$ and left and right rear wheel $W_{RL}$ and $W_{RR}$ of a vehicle, a master cylinder M, which outputs a liquid pressure corresponding to a braking operation quantity, a depression force sensor 1, as an operation quantity detector for detecting the braking operation quantity, a liquid pressure source 2, electric actuators $3_{FL}$, $3_{FR}$, $3_{RL}$ and $3_{RR}$, disposed in independent correspondence to the wheel brakes $B_{FL}$, $B_{FR}$, $B_{RL}$ and $B_{RR}$ and capable of adjusting the output liquid pressure from the liquid pressure source 2 in accordance with a detection value detected by the depression force sensor 1 to output such adjusted liquid pressure, and switch-over valves $4_{FL}$, $4_{FR}$, $4_{RL}$ and $4_{RR}$ capable of switching the connection and disconnection between the master cylinder M and the wheel brakes $B_{FL}$, $B_{FR}$, $B_{RL}$ and $B_{RR}$.

The master cylinder M is formed into a tandem type having first and second output ports 5 and 6 and includes a reservoir $R_1$. A depression force on a brake pedal 7 is inputted, through a vacuum booster B, to the master cylinder M, and a liquid pressure, corresponding to a boosted input from the vacuum booster B, is outputted from the first and second output ports 5 and 6. The depression force sensor 1 is interposed between the brake pedal 7 and the vacuum booster B and capable of detecting the depression force on the brake pedal, i.e., the braking operation quantity.

The liquid pressure source 2 includes a liquid pump 8 for pumping a working liquid from a reservoir $R_2$, an accumulator 9 connected to the liquid pump 8, and a pressure detector 10 for detecting a pressure in the accumulator 9.

The electric actuators $3_{FL}$, $3_{FR}$, $3_{RL}$ and $3_{RR}$ have basically the same construction and, hence, only the electric actuator $3_{FL}$ will be described below in detail, the detailed description of the other electric actuators $3_{FR}$, $3_{RL}$ and $3_{RR}$, being identical, are omitted.

Figure 2:
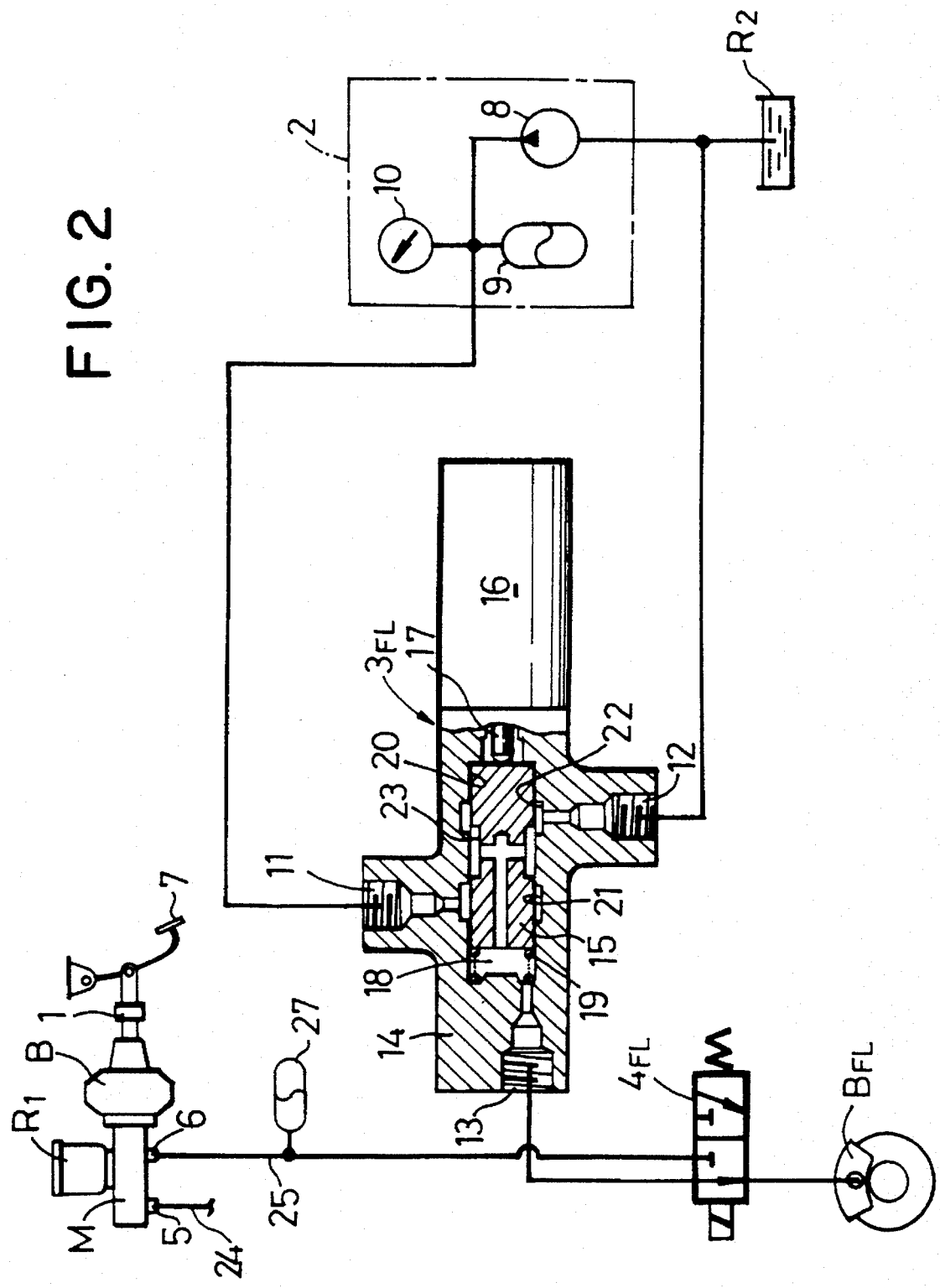

Referring to FIG. 2 the electric actuator $3_{FL}$ includes a housing 14, a spool 15, slidably fitted in the housing 14, and a linear solenoid 16. The housing 14 includes an input port 11 connected to the liquid pressure source 2, a release port 12 leading to the reservoir $R_2$ and an output port 13. The linear solenoid 16 is mounted to the housing 14 so as to urge the spool 15 in an axial direction.

The linear solenoid 16 has a driving rod 17 which coaxially abuts against one end of the spool 15. An output chamber 18 is defined in the housing 14 and the other end face of the spool 15 faces the output chamber 18. Moreover, the output chamber 18 leads to the output port 13. A return spring 19 is accommodated in the output chamber 18 for biasing the spool 15 toward the linear solenoid 16. Thus, the spool 15 is normally put in abutment against the driving rod 17 by a spring force of the return spring 19.

The housing 14 is provided with a cylinder bore 20 in which the spool 15 is slidably fitted. An annular groove 21, leading to the input port 11, and another annular groove 22, leading to the release port 12, are provided in an inner surface of the cylinder bore 20 at axially spaced locations. An annular recess 23 is provided in an outer surface of the spool 15 to normally lead to the output chamber 18. Thus, the spool 15 switches over between a position in which the annular recess 23 is communicated with the annular groove 21 to put the input port 11 and the output chamber 18 (i.e., the output port 13) into communication with each other, and a position in which the annular recess 23 is communicated with the annular groove 22 to put the output chamber 18 and the release port 12 into communication with each other, in accordance with the axial displacement of the spool 15 caused by the magnitude relationship between a thrust force of the linear solenoid 16, acting on axially one end of the spool 15, and a liquid pressure force in the output chamber 18, acting on the axially other end of the spool 15.

The linear solenoid 16 generates a thrust force corresponding to a quantity of electricity applied thereto. Thus, it is possible to control the liquid pressure in the output chamber 18, i.e., the liquid pressure outputted through the output port 13 to any level by controlling the energizing quantity of electricity of the linear solenoid 16.

Such electric actuators $3_{FL}$, $3_{FR}$, $3_{RL}$ and $3_{RR}$ make it possible to output a braking liquid pressure, even during a non-braking operation in which the brake pedal is not depressed, by controlling the energizing quantity of electricity of the linear solenoid 16. Therefore, it is possible to easily carry out a traction control by adding a braking force to the driven wheels, and an anti-lock brake control during a braking operation.

Referring again to FIG. 1, liquid pressure passages 24 and 25 are connected to the first and second output ports 5 and 6 in the master cylinder M, respectively. On the other hand, the switch-over valve $4_{FL}$ is a solenoid switch-over valve which is switchable between a state in which it permits the left front wheel brake $B_{FL}$ to be put into communication with the electric actuator $3_{FL}$, but to be put out of communication with the liquid pressure passage 25 during energization thereof, and a state in which it permits the left front wheel brake $B_{FL}$ to be put into communication with the liquid pressure passage 25, but to be put out of communication with the electric actuator $3_{FL}$ during deenergization thereof. The switch-over valve $4_{FR}$ is a solenoid switch-over valve which is switchable between a state in which it permits the right front wheel brake $B_{FR}$ to be put into communication with the electric actuator $3_{FR}$, but to be put out of communication with the liquid pressure passage 24 during energization thereof, and a state in which it permits the right front wheel brake $B_{FR}$ to be put into communication with the liquid pressure passage 24, but to be put out of communication with the electric actuator $3_{FR}$ during deenergization thereof. The switch-over valve $4_{RL}$ is a solenoid switch-over valve, which is switchable between a state in which it permits the left rear wheel brake $B_{RL}$ to be put into communication with the electric actuator $3_{RL}$, but to be put out of communication with the liquid pressure passage 24 during energization thereof, and a state in which it permits the left rear wheel brake $B_{RL}$ to be put into communication with the liquid pressure passage 24, but to be put out of communication with the electric actuator $3_{RL}$ during deenergization thereof. The switch-over valve $4_{RR}$ is a solenoid switch-over valve which is switchable between a state in which it permits the right rear wheel brake $B_{RR}$ to be put into communication with the electric actuator $3_{RR}$, but to be put out of communication with the liquid pressure passage 25 during energization thereof, and a state in which it permits the right rear wheel brake $B_{RR}$ to be put into communication with the liquid pressure passage 25, but to be put out of communication with the electric actuator $3_{RR}$ during deenergization thereof.

Thus, stroke accumulators 26, 27 are connected to the liquid pressure passages 24 and 25 for accumulating a liquid pressure outputted from the first and second output ports 5 and 6 in the master cylinder M, in response to the braking operation, to insure a stroke of depression of the brake pedal 7, when each of the switch-over valves $4_{FL}$, $4_{FR}$, $4_{RL}$ and $4_{RR}$ is in the energized state in which each of the electric actuators $3_{FL}$, $3_{FR}$, $3_{RL}$ and $3_{RR}$ is put into communication with corresponding one of the wheel brakes $B_{FL}$, $B_{FR}$, $B_{RL}$ and $B_{RR}$, i.e., in which the liquid pressure passage 24, 25 are put out of communication with each of the wheel brakes $B_{FL}$, $B_{FR}$, $B_{RL}$ and $B_{RR}$.

Figure 3:
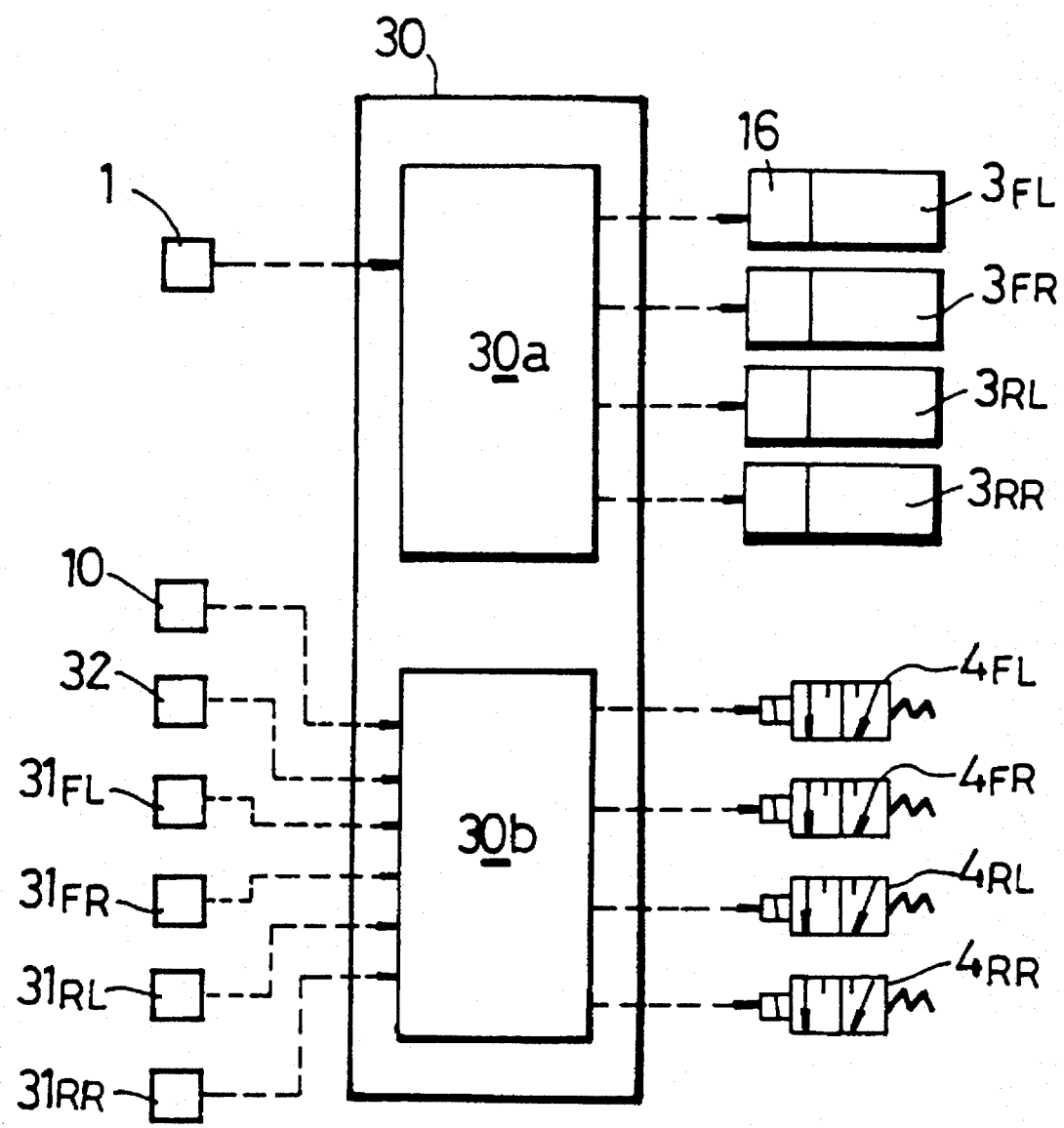

Referring to FIG. 3, the operation quantity (i.e., energizing quantity) of the linear solenoid 16, in each of the electric actuators $3_{FL}$, $3_{FR}$, $3_{RL}$ and $3_{RR}$, and the shifting of each of the switch-over valves $4_{FL}$, $4_{FR}$, $4_{RL}$ and $4_{RR}$, i.e., the switching between the energization and deenergization thereof, are controlled by an electronic control unit 30. The electronic control unit 30 includes a braking pressure control means 30a, which applies an electric signal, corresponding to a target braking pressure determined on the basis of a detection value detected by the depression sensor 1, to each of the linear solenoids 16, and a switch-over valve control means 30b for controlling the operation of the switch-over valves $4_{FL}$, $4_{FR}$, $4_{RL}$ and $4_{RR}$.

Thus, each of the linear solenoids 16, of the electric actuators $3_{FL}$, $3_{FR}$, $3_{RL}$ and $3_{RR}$, is operated in accordance with an output electric signal from the braking pressure control means 30a, whereby an output liquid pressure from each of the electric actuators $3_{FL}$, $3_{FR}$, $3_{RL}$ and $3_{RR}$ becomes a value corresponding to the braking operation quantity.

Pressure detectors $31_{FL}$, $31_{FR}$, $31_{RL}$ and $31_{RR}$, for detecting braking pressures applied to the wheel brakes $B_{FL}$, $B_{FR}$, $B_{RL}$ and $B_{RR}$, are connected between the switch-over valves $4_{FL}$, $4_{FR}$, $4_{RL}$ and $4_{RR}$ and the wheel brakes $B_{FL}$, $B_{FR}$, $B_{RL}$ and $B_{RR}$, respectively. A pressure detector 32, for detecting an output liquid pressure from the master cylinder M, is connected to at least one of the liquid pressure passages 24 and 25, as shown in FIG. 1. The switch-over valve control means 30b controls shifting operations of the switch-over valves $4_{FL}$, $4_{FR}$, $4_{RL}$ and $4_{RR}$ on the basis of detection values detected by the pressure detectors $31_{FL}$, $31_{FR}$, $31_{RL}$, $31_{RR}$ and 32 as well as a detection value detected by the pressure detector 10 provided in the liquid pressure source 2. A control procedure is previously established therein, as shown in FIGS. 4 and 5.

Figure 4:
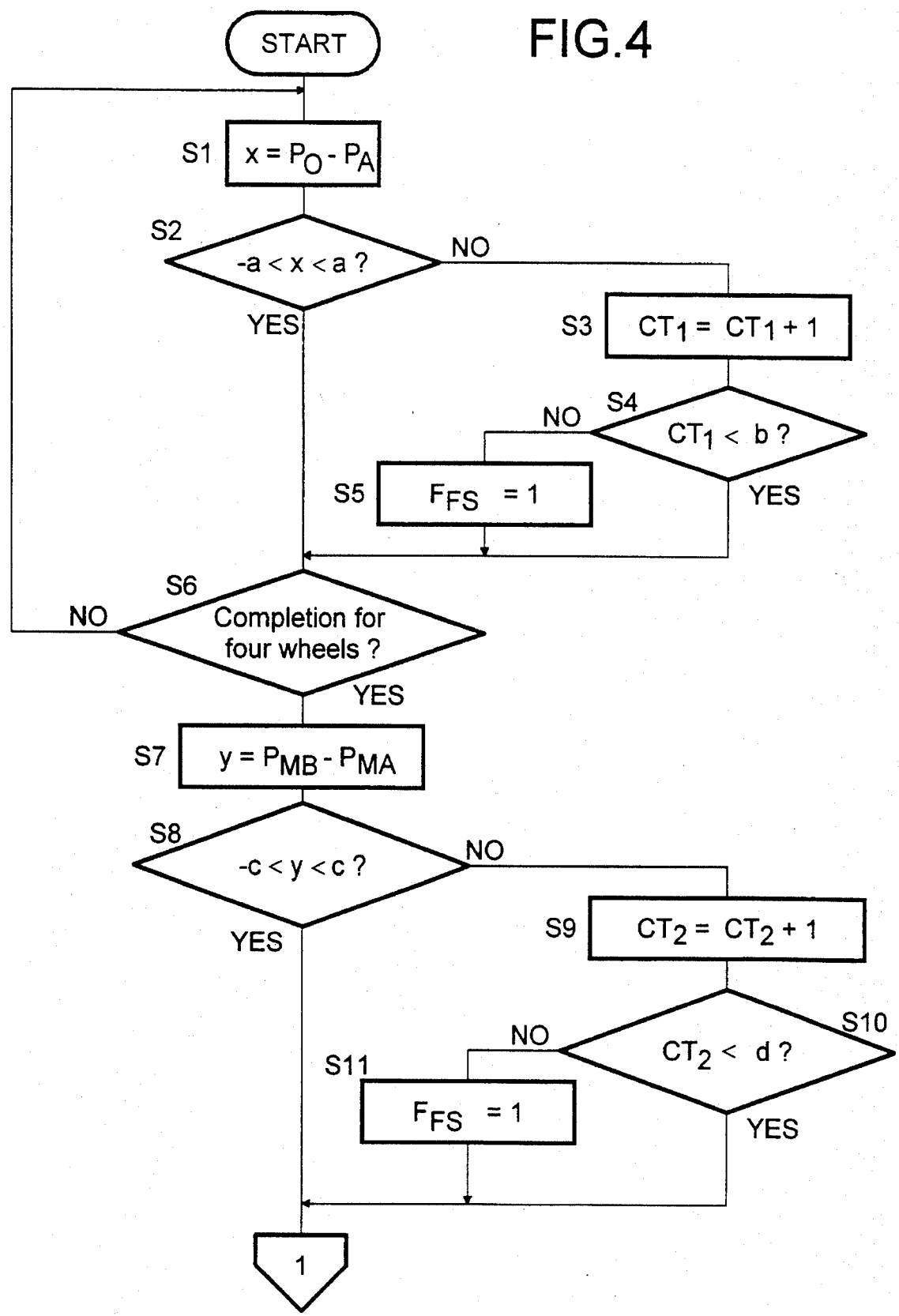
Figure 5:
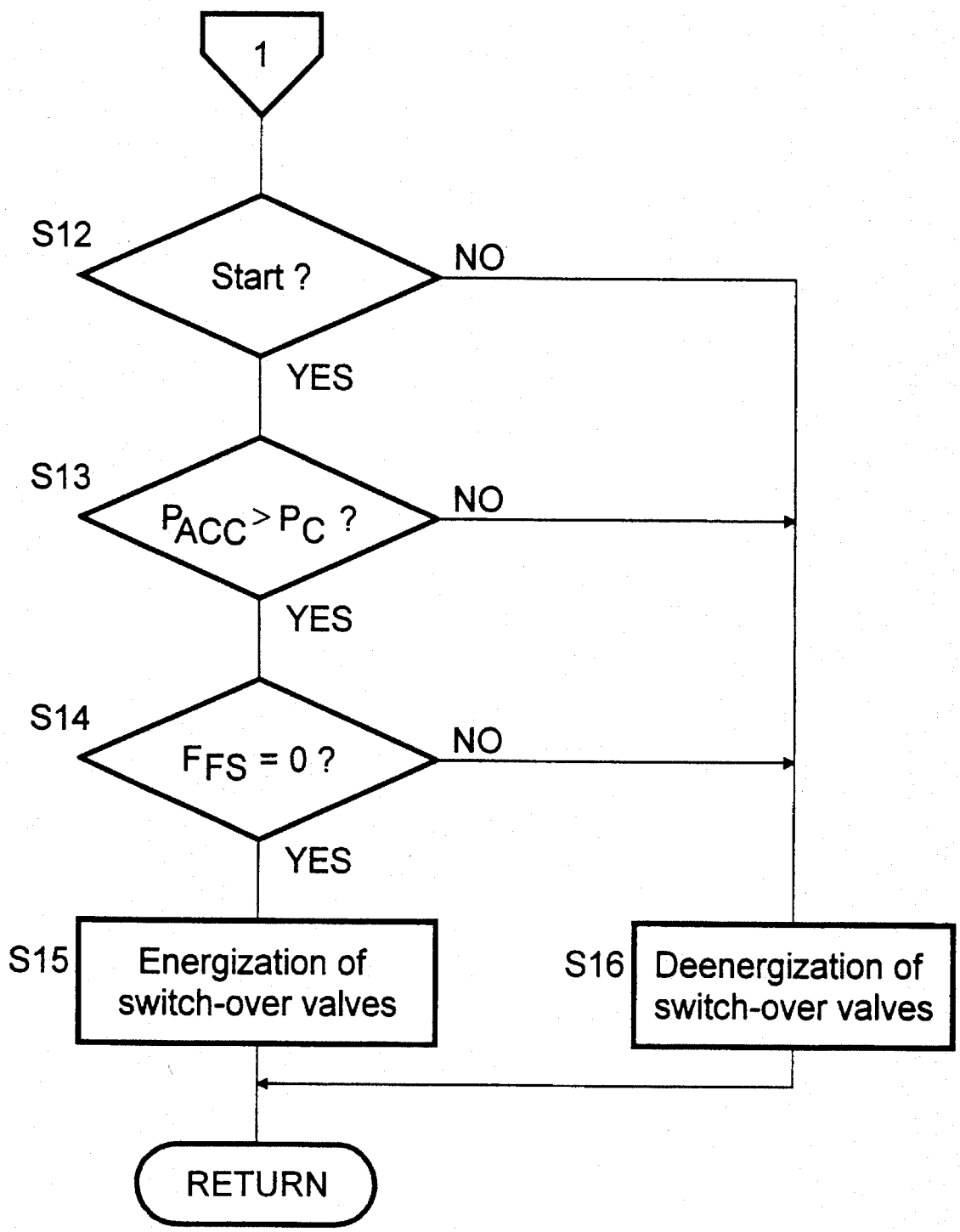

Referring first to FIG. 4, at step S1, a difference x ($=P_0-P_A$) between a target braking pressure $P_0$, determined in the braking pressure control means 30a in accordance with the detection value detected by the depression force sensor 1 (i.e., the braking operation quantity) and an actual braking pressure $P_A$, applied to the pressure detectors $31_{FL}$, $31_{FR}$, $31_{RL}$ and $3_{RR}$ and, thus, to the wheel brakes $B_{FL}$, $B_{FR}$, $B_{RL}$ and $B_{RR}$, is calculated. At step S2, it is judged whether the difference x is in a predetermined range, i.e., whether a relation, $-a<x<a$ (wherein a is a predetermined value) is established. If it is decided that $x\leq-a$, or $a\leq x$, the processing is advanced to step S3, at which "1" is added to a count value $CT_1$. If it is decided, at step S4, that the count value $CT_1$ is less than a predetermined count value b ($CT_1<b$), the processing is advanced to step S6. If it is decided, at step S4, that $b\leq CT_1$, the processing is advanced from step S4 to step S5 at which a flag $F_{FS}$ is set at "1", then progressing to step S6. It if it decided, at step S2, that $-a<x<a$, the processing is advanced to step S6 to bypass steps S3, S4 and S5. It is judged at step S6 whether the procedure from step S1 to step S5 has been completed for all the wheels $W_{FL}$, $W_{FR}$, $W_{RL}$ and $W_{RR}$. If NO, the processing is returned to step S1.

The procedure from step S1 to step S6 is to detect whether a state incapable of providing a braking pressure, corresponding to the detection value detected by the depression force sensor 1, due to a trouble in the electric actuators $3_{FL}$, $3_{FR}$, $3_{RL}$ and $3_{RR}$, themselves, a trouble in an electric circuit for driving the electric actuators $3_{FL}$, $3_{FR}$, $3_{RL}$ and $3_{RR}$ is sustained for a predetermined period of time. If it is decided that there is such a trouble, the flag $F_{FS}$ is set at "1".

At a next step S7a, difference y ($=P_{MB}-P_{MA}$) between a reference master cylinder pressure $P_{MB}$ determined, depending upon the detection valve detected by the depression force sensor 1 (i.e., the braking operation quantity), and an output liquid pressure $P_{MA}$ from the pressure detector 32, i.e, the master cylinder M is calculated. At step S8, it is judged whether the difference y is within a predetermined range, i.e., whether $-c<y<c$ (wherein c is a predetermined value) is established. If it is decided that $y\leq-c$, or $c\leq y$, the processing is advanced to step S9 at which "1" is added to a count value $CT_2$. If it is decided, at step S10, that the count value $CT_2$ is less than a predetermined count value d ($CT_2<d$), the processing is advanced to step S12. If it is decided that $d\leq CT_2$, the processing is advanced from step S10 to step S11 at which the flag $F_{FS}$ is set at "1", progressing to step S12 If it is decided, at step S8, that $-c<y<c$, the processing is advanced to the 12th step S12 to bypass steps S9, S10 and S11.

Such procedure, from step S7 to step S11, is to detect whether a deviation has been produced between the reference master cylinder pressure $P_{MB}$ determined depending upon the detection valve detected by the depression force sensor 1 and the actual pressure $P_{MA}$ of the master cylinder, due to a trouble in the depression force sensor 1, or the like. If it is decided that there is the trouble in the depression force sensor 1 or the like, the flag $F_{FS}$ is set at "1".

Referring to FIG. 5, at step S12, it is judged whether an ignition switch has been operated, i.e., the engine has already been started. At step S13, it is judged whether an output liquid pressure $P_{ACC}$ from the liquid pressure source 2, detected by the pressure detector 10, exceeds a predetermined value $P_C$. At step S14, it is judged whether the flag $F_{FS}$ is equal to "0" (zero). If it is decided that the output liquid pressure $P_{ACC}$ exceeds the predetermined value $P_C$, after the start of the engine and $F_{FS}=0$, the switch-over valves $4_{FL}$, $4_{FR}$, $4_{RL}$ and $4_{RR}$ are brought into energized states at step S15. More specifically, the switch-over valves $4_{FL}$, $4_{FR}$, $4_{RL}$ and $4_{RR}$ are brought into states in which they permit the electric actuators $3_{FL}$, $3_{FR}$, $3_{RL}$, and $3_{RR}$ to be connected to the corresponding wheel brakes $B_{FL}$, $B_{FR}$, $B_{RL}$ and $B_{RR}$. On the other hand, the switch-over valves $4_{FL}$, $4_{FR}$, $4_{RL}$ and $4_{RR}$ are brought into deenergized states at step S16, if at least one of the following three conditions is established:

1) the ignition switch has not been operated
2) the output liquid pressure $P_{ACC}$ from the liquid pressure source 2 is less than the predetermined value $P_C$, and
3) the flag $F_{FS=1}$.

In other words, the switch-over valves $4_{FL}$, $4_{FR}$, $4_{RL}$ and $4_{RR}$ are brought into states in which they permit the output liquid pressure from the master cylinder M to be applied to the corresponding wheel brakes $B_{FL}$, $B_{FR}$, $B_{RL}$ and $B_{RR}$.

The operation of the first embodiment will be described below. Suppose that a trouble has been produced in the electric actuators $3_{FL}$, $3_{FR}$, $3_{RL}$ and $3_{RR}$, themselves, or in the electric circuit for driving the electric actuators $3_{FL}$, $3_{FR}$, $3_{RL}$ and $3_{RR}$ during a braking operation by depression of the brake pedal 7. In this case, the output liquid pressures from the electric actuators $3_{FL}$, $3_{FR}$, $3_{RL}$ and $3_{RR}$ are reduced, so that a braking pressure intended by a driver may not be provided in some cases. However, when the state in which the difference between the target braking pressure $P_0$, determined depending upon the braking operation quantity and the braking pressure $P_A$ applied to the wheel brakes $B_{FL}$, $B_{FR}$, $B_{RL}$ and $B_{RR}$ exceeds the predetermined range, and has been sustained for the predetermined period of time, or more, the switch-over control means 30b decides that there is trouble in the electric actuators $3_{FL}$, $3_{FR}$, $3_{RL}$ and $3_{RR}$, themselves, or in the electric circuit for driving the electric actuators $3_{FL}$, $3_{FR}$, $3_{RL}$ and $3_{RR}$, thereby allowing the switch-over valves $4_{FL}$, $4_{FR}$, $4_{RL}$ and $4_{RR}$ to be shifted to the states in which they connect the master cylinder M with the wheel brakes $B_{FL}$, $B_{FR}$, $B_{RL}$ and $B_{RR}$. This enables the output liquid pressure from the master cylinder M to be applied to the wheel brakes $B_{FL}$, $B_{FR}$, $B_{RL}$ and $B_{RR}$, thereby preventing the pressure applied to the wheel brakes $B_{FL}$, $B_{FR}$, $B_{RL}$ and $B_{RR}$ from being reduced more than necessary. Moreover, in an example in which a depression force on the brake pedal 7 is amplified by the vacuum booster B and transmitted to the master cylinder M, as in this embodiment, a liquid pressure equal to a normal liquid pressure outputted from the electric actuators $3_{FL}$, $3_{FR}$, $3_{RL}$ and $3_{RR}$ can be applied from the master cylinder M to the wheel brakes $B_{FL}$, $B_{FR}$, $B_{RL}$ and $B_{RR}$.

If there is a trouble in the depression force sensor 1 during the braking operation, provided by depression of the brake pedal 7, a deviation is produced between the actual output liquid pressure $P_{MA}$ from the master cylinder M, and the reference master cylinder pressure $P_{MB}$ based on the detection value detected by the depression force sensor 1 having the trouble. If there is such a trouble in the depression force sensor 1, the braking pressure applied from the electric actuators $3_{FL}$, $3_{FR}$, $3_{RL}$ and $3_{RR}$ to the wheel brakes $B_{FL}$, $B_{FR}$, $B_{RL}$ and $B_{RR}$ is different from a braking pressure intended by the driver. However, when the state in which the difference between the reference master cylinder pressure $P_{MB}$ determined, depending upon the braking operation quantity and the liquid pressure $P_{MA}$ actually outputted from the master cylinder M exceeds the predetermined range, and has been sustained for a predetermined period of time, the switch-over control means 30b decides that there is the trouble in the depression force sensor 1, thereby allowing the switch-over valves $4_{FL}$, $4_{FR}$, $4_{RL}$ and $4_{RR}$ to be shifted to the states in which they permit the master cylinder and the wheel brakes $B_{FL}$, $B_{FR}$, $B_{RL}$ and $B_{RR}$ to be put into communication with each other, respectively. This enables the output liquid pressure, from the master cylinder M, to be applied to the wheel brakes, $B_{FL}$, $B_{FR}$, $B_{RL}$ and $B_{RR}$, thereby a braking pressure, intended by the driver, to be applied to the wheel brakes $B_{FL}$, $B_{FR}$, $B_{RL}$ and $B_{RR}$.

In the first embodiment, the switch-over valves $4_{FL}$, $4_{FR}$, $4_{RL}$ and $4_{RR}$ have been used in the form of the solenoid switch-over valves which are switchable between the states in which they permit the wheel brakes $B_{FL}$, $B_{FR}$, $B_{RL}$ and $B_{RR}$ to be put into communication with the electric actuators $3_{FL}$, $3_{FR}$, $3_{RL}$ and $3_{RR}$, but to be put out of communication with the master cylinder M, and the states in which they permit the wheel brakes $B_{FL}$, $B_{FR}$, $B_{RL}$ and $B_{RR}$ to be put into communication with the master cylinder M, but to be put out of communication with the electric actuators $3_{FL}$, $3_{FR}$, $3_{RL}$ and $3_{RR}$. Alternatively, the electric actuators $3_{FL}$, $3_{FR}$, $3_{RL}$ and $3_{RR}$ may be connected to the wheel brakes $B_{FL}$, $B_{FR}$, $B_{RL}$ and $B_{RR}$ through a liquid pressure transfer means 34 which is capable of the transfer of a liquid pressure, but which blocks a flow of the working liquid, and a switch-over valve $44_{FL}$ in the form of a normally-opened solenoid valve closed by energization thereof may be incorporated between the master cylinder M and each of the wheel brakes $B_{FL}$, $B_{FR}$, $B_{RL}$ and $B_{RR}$, as in a second embodiment of FIG. 6.

Figure 6:
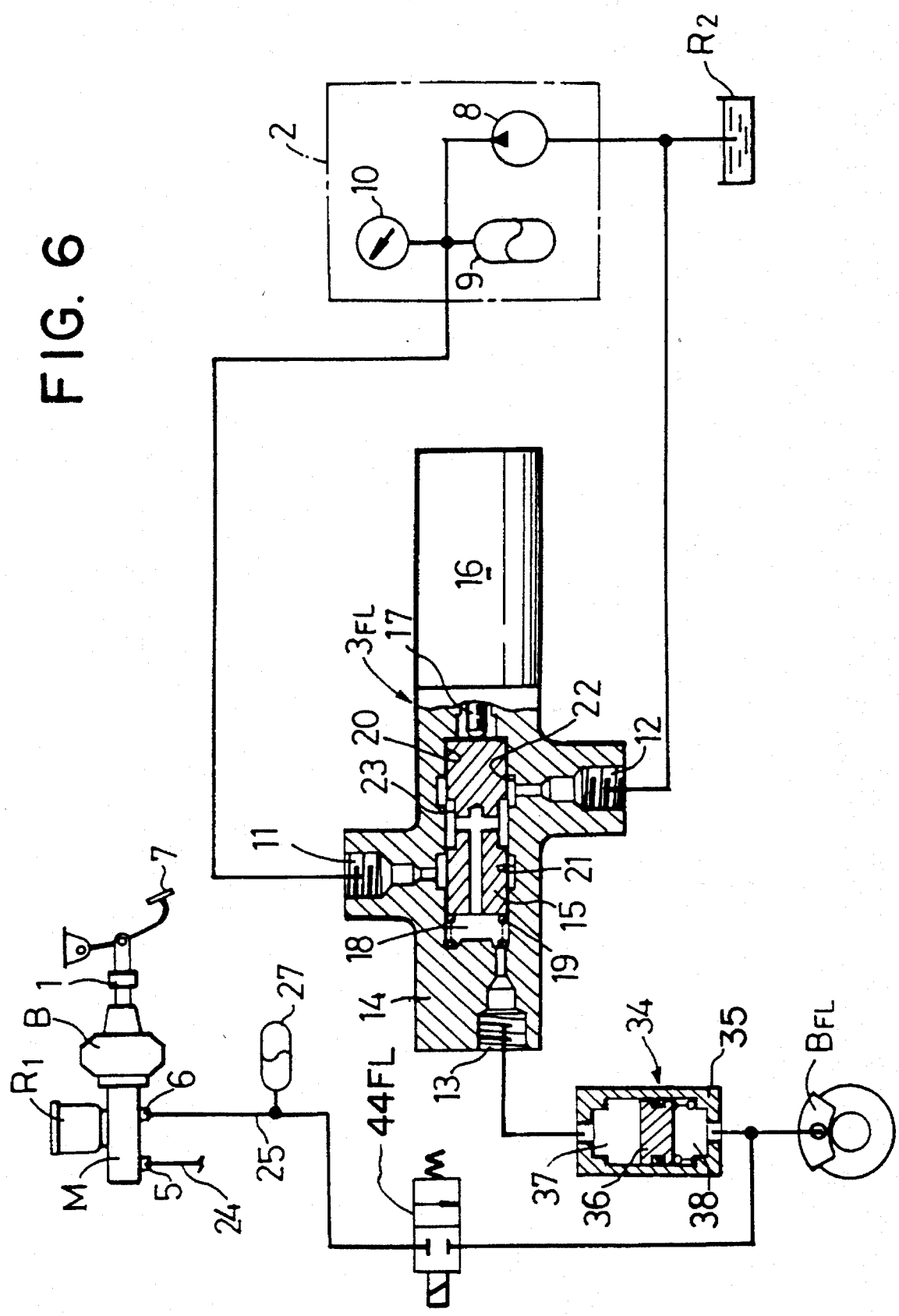
FIG. 6 is a sectional view similar to FIG. 2, but illustrating a second embodiment.

The liquid pressure transfer means 34 of the second embodiment of FIG. 6 includes a free piston 36, slidably received in a cylindrical casing 35. An input liquid pressure chamber 37 is defined between one end of the free piston 36 and the casing 35, so that an output liquid pressure from each of the electric actuators $3_{FL}$, $3_{FR}$, $3_{RL}$ and $3_{RR}$ is applied to the input liquid pressure chamber 37. An output liquid pressure chamber 38 is defined between the other end of the free piston 36 and the casing to lead to the wheel brakes $B_{FL}$, $B_{FR}$, $B_{RL}$ and $B_{RR}$. Such liquid pressure transfer means 34 ensures that when the switch-over valve $44_{FL}$ is in its energized state to block the communication between the master cylinder M and each of the wheel brakes $B_{FL}$, $B_{FR}$, $B_{RL}$ and $B_{RR}$, the output liquid pressure from each of the electric actuators $3_{FL}$, $3_{FR}$, $3_{RL}$ and $3_{RR}$ is applied to corresponding one of the wheel brakes $B_{FL}$, $B_{FR}$, $B_{RL}$ and $B_{RR}$ through the free piston 36, and when the switch-over valve $44_{FL}$ is deenergized to permit the communication between the master cylinder M and each of the wheel brakes $B_{FL}$, $B_{FR}$, $B_{RL}$ and $B_{RR}$, the output liquid pressure from the master cylinder M can be applied to each of the wheel brakes $B_{FL}$, $B_{FR}$, $B_{RL}$ and $B_{RR}$, and the flowing of the working liquid from the wheel brakes $B_{FL}$, $B_{FR}$, $B_{RL}$ and $B_{RR}$ to the electric actuators $3_{FL}$, $3_{FR}$, $3_{RL}$ and $3_{RR}$ is blocked.

Although the embodiments of the present invention have been described in detail, it will be understood that the present invention is not limited to these embodiments, and various modifications and variations in design may be made without departing form the spirit and scope of the invention defined in claims.

For example, the electric actuators adapted to adjust the output liquid pressure from the liquid pressure source in accordance with the braking operation quantity to output it have been used in the above-described embodiments, but it is possible to employ an electric actuator designed to directly output a liquid pressure corresponding to the braking operation quantity.

What is claimed is:

1. A brake system for a vehicle, comprising a wheel brake, a master cylinder for outputting a liquid pressure corresponding to a braking operation quantity, an operation quantity detector for detecting said braking operation quantity, a braking pressure control means for outputting an electric signal corresponding to a target braking pressure determined on the basis of a detection value detected by said operation quantity detector, an electric actuator capable of outputting a liquid pressure corresponding to said output electric signal from said braking pressure control means, and a switch-over valve capable of switching a connection and disconnection between said master cylinder and said wheel brake, said switch-over valve being connected to said wheel brake to block flow of a working liquid from said wheel brake into said electric actuator, when said switch-over valve permits said master cylinder and said wheel brake to be put into communication with each other, wherein said system further comprises:

a pressure detector for detecting a braking pressure applied to said wheel brake;

a switch-over valve control means for controlling operation of said switch-over valve to a state in which said master cylinder and said wheel brake are put into communication with each other, when a difference between said target braking pressure and a detection value detected by said pressure detector exceeds a predetermined range; and further comprising a second pressure detector for detecting an output liquid pressure from said master cylinder, and wherein control of said switch-over valve is conducted when a difference between a reference master cylinder pressure determined on the basis of said braking operation and said detection value detected by said pressure detector exceeds a second predetermined range.

2. The brake system according to claim 1, further comprising a liquid pressure source means including a liquid pump, a pressure detector and a pressure accumulator for supplying liquid pressure generated from a reservoir to said electric actuator which then supplies liquid pressure through said switch-over valve to said wheel brake.

3. The brake system according to claim 1 wherein said wheel brake comprises a plurality of wheel brakes with each wheel brake being associated with a wheel of a plurality of wheels of said vehicle and said electric actuator comprises a plurality of electric actuators with each electric actuator connected to said respective wheel brakes independently from each other, wherein said pressure detector comprises a plurality of pressure detectors such that of a pressure detector is associated with each of said electric actuators of said plurality of electric actuators and said difference between said target braking pressure and said detection value is detected for each of said electric actuators and associated pressure detectors, and wherein control of said switch-over valve is conducted when at least one of said detected differences exceeds said predetermined range.

4. The brake system according to claim 3, further comprising a second pressure detector for detecting an output liquid pressure from said master cylinder, and wherein control of said switch-over valve is conducted when a difference between a reference master cylinder pressure determined on the basis of said braking operation and any one of detection values detected by said pressure detectors exceeds a second predetermined range.

5. A brake system for a vehicle, comprising a wheel brake, a master cylinder for outputting a liquid pressure corresponding to a braking operation quantity, an operation quantity detector for detecting said braking operation quantity, a braking pressure control means for outputting an electric signal corresponding to a target braking pressure determined on the basis of a detection value detected by said operation quantity detector, an electric actuator capable of outputting a liquid pressure corresponding to said output electric signal from said braking pressure control means, and a switch-over valve capable of switching a connection and disconnection between said master cylinder and said wheel brake, said switch-over valve being connected to said wheel brake to block flow of a working liquid from said wheel brake into said electric actuator, when said switch-over valve permits said master cylinder and said wheel brake to be put into communication with each other, wherein said system further comprises:

a pressure detector for detecting an output liquid pressure from said master cylinder;

a switch-over valve control means for controlling operation of said switch-over valve to a state in which said master cylinder and said wheel brake are put into communication with each other, when a difference between a reference master cylinder pressure determined on the basis of said braking operation quantity and a detection value detected by said pressure detector exceeds a predetermined range; and further comprising a second pressure detector for detecting an output liquid pressure from said master cylinder, and wherein control of said switch-over valve is conducted when a difference between a reference master cylinder pressure determined on the basis of said braking operation and said detection value detected by said pressure detector exceeds a second predetermined range.

6. The brake system according to claim 5, further comprising liquid pressure source means including a liquid pump, a pressure detector and a pressure accumulator for supplying liquid pressure generated from a reservoir to said electric actuator which then supplies liquid pressure through said switch-over valve to said wheel brake.

\* \* \* \* \*